United States Patent [19]

Chertok et al.

[11] Patent Number: 4,490,093
[45] Date of Patent: Dec. 25, 1984

[54] WINDPOWER SYSTEM

[75] Inventors: Allan Chertok; John Gjertsen, Sr., both of Bedford; Louis Manfredi, Watertown, all of Mass.

[73] Assignee: U.S. Windpower, Inc., Burlington, Mass.

[21] Appl. No.: 282,965

[22] Filed: Jul. 13, 1981

[51] Int. Cl.³ .............................................. F03D 7/04
[52] U.S. Cl. ........................................ 416/26; 416/32; 416/41; 416/152; 416/165
[58] Field of Search .............. 416/11, 41 A, 43, 43 A, 416/44 A, 51 A, 52 A, 152, 31, 32, 151, 165, 26

[56] References Cited

U.S. PATENT DOCUMENTS

| | | | |
|---|---|---|---|
| 1,929,436 | 10/1933 | McCollough | 416/151 |
| 2,480,468 | 8/1949 | Hoinville | 416/151 |
| 2,738,045 | 3/1956 | Mergen et al. | 416/151 X |
| 2,860,714 | 11/1958 | DeMuth | 416/43 |
| 4,006,925 | 2/1977 | Scherer | 416/44 A X |
| 4,047,842 | 9/1977 | Avena et al. | 416/152 |
| 4,066,911 | 1/1978 | Sarchet | 416/132 B X |
| 4,193,005 | 3/1980 | Kos et al. | 416/43 A X |
| 4,310,284 | 1/1982 | Randolph | 416/132 B |
| 4,348,154 | 9/1982 | Ducker | 416/43 |
| 4,364,708 | 12/1982 | David | 416/132 B |
| 4,366,387 | 12/1982 | Carter et al. | 416/132 B X |

FOREIGN PATENT DOCUMENTS

| | | | |
|---|---|---|---|
| 743890 | 1/1944 | Fed. Rep. of Germany | 416/44 A |
| 1065339 | 9/1959 | Fed. Rep. of Germany | 416/152 |
| 908631 | 4/1946 | France | 416/11 |
| 937903 | 8/1948 | France | 416/43 A |
| 780142 | 11/1980 | U.S.S.R. | 416/32 |

Primary Examiner—Everette A. Powell, Jr.
Attorney, Agent, or Firm—Cesari and McKenna

[57] ABSTRACT

A windpower system includes a support and a turbine having a shaft rotatively mounted to the support. The turbine has variable pitch blades whose pitch is controlled by the differential motion of a rotary control shaft coaxial with the turbine shaft and the turbine shaft itself so that the blade pitch can be varied by a stationary motor without requiring any slip rings or other such wear-prone couplings. In the event of a power failure, rotary motion of the control shaft is prevented so that the turbine blades are feathered solely due to the force developed by the rotating turbine. Also, if the turbine is used to generate electrical power, an induction generator coupled to the turbine shaft is employed whose shaft speed is indicative of generator output power. Accordingly, generator speed is monitored and used to control the pitch of the turbine blades so as to maintain generator output power at the maximum value when wind speed is below the machine's rated wind speed, and no more than rated output power when wind speed exceeds rated wind speed.

5 Claims, 6 Drawing Figures

WINDPOWER SYSTEM

This invention relates to a windpower system or wind turbine and more particularly to apparatus for controlling the pitch of variable pitch turbine blades in such a system in response to wind speed changes. The present windpower system is especially useful for generating electrical energy. An overview of windpower systems used for such a purpose is contained in an article by E. Henson, entitled "Electrical Energy from the Wind." found in the Energy Technology Handbook at 6–142 et seq (1977).

BACKGROUND OF THE INVENTION

There are, in present day use, numerous different types of windpower systems or wind turbines used to generate electrical power. These systems usually include a shaft-mounted turbine whose torque output is used to drive an electrical generator. When wind conditions are favorable, the electrical output from the generator is coupled into the electrical utilities' transmission lines. On the other hand when the wind speed is too low, the generator is isolated from those lines. In order to operate the generator at its optimum speed for maximum power output, the wind turbine must produce a selected relatively constant torque despite changes in wind speed. This is accomplished in most systems by sensing the rotational speed of the turbine. To maintain constant output power then, the pitch of the turbine blades is varied so that the blades intercept more or less of the moving air stream momentum thereby to regulate the torque output of the turbine and, as a result, its speed.

Prior windpower systems have employed pitch angle control mechanisms which are either more complex or less effective than that of this invention. Therefore, they are unduly costly to manufacture and repair, or are less effective in controlling the speed of the turbine. For example, some conventional turbines employ hydraulic pistons to change the blade pitch, with the fluid flow in the pistons being controlled by a speed-controlling governor. Examples of such arrangements are disclosed in U.S. Pat. No. 2,832,895 and on page 351 of Van Nostrand's *Scientific Encyclopedia*, Third Edition 1958. In another system, described in U.S. Pat. No. 2,583,369, the turbine hub is slidably mounted on its shaft. The turbine blades are terminated inside the hub by cams which slide in slots on that shaft. Also, springs bias the hub to a reference position on the shaft. As the wind exerts pressure on the blades, the hub slides in one direction or the other on its shaft so that the blades are cammed to the proper pitch.

Still another rather complex pitch control mechanism is disclosed in U.S. Pat. No. 2,360,792. That mechanism includes a hydraulic actuator and hydraulic compensated governor. The actuator's piston is connected to the turbine blades and the movement of the piston changes the blade pitch. In response to wind speed changes, the hydraulic governor delivers fluid under pressure to the actuator to cause the blades to assume their proper pitch.

Other prior windpower systems utilize various electrical components to control blade pitch, examples of same being described in U.S. Pat. Nos. 3,974,395; 4,095,120 and 4,160,170. However those arrangements require slip rings and other sliding electrical contact elements which are prone to failure due to surface corrosion, wear and contamination by dirt and moisture. In short, then, the prior systems are not as simple and trouble-free as they might be. Also some of them do not maintain adequate control over the turbine during unusual circumstances such as the occurrence of sudden strong winds which subject the components of the system to unusually high mechanical stress.

Also, in wind turbines such as this, it is essential that the pitch control mechanism be designed such that anticipated modes of failure drive the blades to their feather position at which they produce little or no torque so the turbine stops. For that purpose, prior apparatus rely on spring forces, complex battery-powered motor systems, or the self-feathering aerodynamic properties of the turbine itself. In some circumstances, such as where the blades or the pitch control mechanism is seized or ice-locked, these forces may be insufficient to feather the blades so that considerable damage to the turbine may result.

SUMMARY OF THE INVENTION

Accordingly the present invention aims to provide an improved windpower system or wind turbine.

Another object of the invention is to provide such a system which achieves unusually close control over the pitch of the system's turbine blades in response to wind speed changes.

Another object is to provide such a system which in conjunction with an electrical generator produces maximum electrical power output under a wide variety of different wind conditions.

A further object of the invention is to provide a windpower system which shuts down rapidly in response to excessive wind speed and other emergency situations.

A further object is to provide a wind turbine which develops unusually large forces to feather the blades in an emergency in the event they have become seized or ice-bound.

Still another object of the invention is to provide a windpower system which can operate for a prolonged period without maintainance.

Yet another object of the invention is to provide a system such as this which utilizes, to a large extent, conventional off-the-shelf components so that the cost of the system is kept to a minimum.

Another object of the invention is to provide a windpower system whose individual parts can be repaired or replaced relatively easily in a minimum amount of time.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present windpower system is designed to be pivotally mounted atop a high tower so that it can swivel or yaw with the result that the turbine blades always intercept the wind stream. Usually the windpower system or turbine is one of many situated on a "farm" with the electrical outputs of all of the systems being coupled into the power grid of a nearby electrical utility. Each system provides an electrical output to the utility as long as the prevailing wind speed exceeds a minimum value. When the wind speed drops below that value, no useful power output can be developed by the turbine and, therefore, the system is decoupled from the power grid.

Each system comprises a tubular turbine shaft which is rotatably mounted on a frame support. A turbine is connected to the end of that shaft. When the turbine is rotated by air currents, the torque on that shaft is coupled, via a speed increasing transmission, to the shaft of an electrical generator mounted to the support, causing the generator to develop electric power for delivery to the utility.

The system employs variable pitch turbine blades whose pitch angle can be varied to facilitate turbine start-up and shut-down, and to limit turbine torque output when wind speed exceeds that necessary to produce rated power from the generator. For this, the rotary motion of the turbine shaft is also coupled by a clutch to a coaxially-mounted, tubular, control shaft. The control shaft is internally threaded to accept a threaded pitch actuating rod, which extends from the control shaft into the turbine hub. There, it is connected to the blades by bell cranks so that linear movements of the actuating rod result in changes in the pitch angle of the turbine blades. The same linkages in the hub also rotatively connect the actuating rod to the turbine shaft so that those two elements rotate in unison.

The system further includes a reversible servomotor for rotating the control shaft thereby to adjust the relative speed of the control and turbine shafts. When the turbine blades are oriented at the correct pitch for the prevailing wind speed, the system controller engages the clutch, thereby rotatively coupling the control shaft to the turbine shaft so that those shafts, as well as the actuating rod, rotate in unison. Consequently, there is no linear movement of the actuating rod as would change the pitch of the turbine blades.

However, if the wind speed changes, the system's controller disengages the clutch and drives the servomotor so as to rotate the control shaft either faster or slower than the turbine shaft, thereby to cause the actuating rod to advance or retract by the necessary amount to adjust the pitch angle of the blades for that different wind speed. Thus, in a particular embodiment, if the wind speed decreases, the motor rotates the control shaft faster than the turbine shaft so as to retract the actuating rod and move the blade pitch angle toward the full-power position (i.e. a pitch angle of approximately 0°), with the result that the turbine develops more torque and speeds up. Conversely, if the wind speed increases, the motor rotates the control shaft slower than the turbine shaft. This causes the actuating rod to advance and thereby move the pitch angle of the blades toward the feather position (i.e. a pitch angle of 90°), with the result that the turbine produces less torque and slows down. Thus, the linear or axial position of the actuating rod provides a direct indication of the blade pitch and thus wind speed.

It is important to note that through the use of the aforesaid coaxial differential shaft arrangement, the system is able to transfer control forces to the rotating turbine blades from a fixed rotary servomotor without the need for rotary electrical or hydraulic couplings, swivel joints, swash plates, or other such wear-prone parts as are found on conventional wind turbines.

A blade pitch sensor responds to the linear position of the actuating rod and applies signals to the controller which indicate when the blades are feathered and, when they are at the full-power position. The sensor also signals the controller when the blades are at the so-called start position (i.e. a pitch angle of approximately 45°) which is the optimum position of the blades for initiating turbine rotation, and when the blades are at a so-called scram angle. This angle depends upon the mechanical limits of the turbine. More particularly, each turbine has a maximum safe wind speed at which it can operate at full power. Operation of the turbine above that point jeopardizes the fatigue life of the blades, tower and other mechanical components of the turbine. Thus if the turbine is operating at its maximum rated speed and the blades have had to be feathered back as far as the scram angle (e.g. 20°), this indicates a wind speed unsafe for continued operation of the turbine. In this situation, the controller responds to a signal from the pitch sensor and activates the servomotor so that the control shaft is rotated much slower than, or even in the opposite direction from, the turbine shaft. Resultantly, the blades are moved to their feathered position quite rapidly and the turbine halts.

The present system also includes provision for stopping the turbine in the event of a power failure to the system or under other emergency conditions such as a failure of pitch servo motor. For this purpose, the system employs an electrical brake acting between the control shaft and the support. During normal operation of the turbine, electrical power to the brake, derived from the network which also tools the generator, disengages the brake, so that the control shaft is free to rotate relative to the support. However, if when the turbine is operating, the connection to the power network should be interrupted so that blade pitch is no longer under control, not only is the clutch disengaged, but the de-energized brake engages and couples the control shaft directly to the support. Since the turbine continues to turn, the actuating rod is advanced so that the blades are brought to their fully feathered position thereby halting the turbine. Failsafe feathering, when power is interrupted, is vital because under such a condition, the generator will be unloaded and the sudden loss of torsional load on the turbine will cause it to rapidly accelerate to a destructive overspeed condition if no feathering action is taken.

The same emergency braking action occurs if the blades do not assume a certain pitch angle after they are directed to do so by the controller. For example, if under unsafe wind conditions, the blades reach the scram angle, yet fail to feather within a short time interval because of a malfunction of the servomotor, the controller de-energizes the brake thereby simulating a power failure. The brake thereupon couples the control shaft to the support so that the blades are again driven to the feathered position. Thus the brake serves as a back-up for the servomotor in a scram situation. It is important to appreciate that in this failsafe mode of operation, the blades are feathered solely due to the motion of the wind-driven turbine relative to the braked control shaft. Since the moving turbine possesses a considerable amount of torque, it can apply considerable force to drive the blades to the safe feathered position in the event they are ice-bound or the pitch control mechanism has seized.

Furthermore, in the present system as soon as the blades are feathered, the actuating rod mechanically disengages the brake so that the control shaft is decoupled from the support, while at the same time the rod is coupled to the control shaft. Now, the control shaft, actuating rod, and turbine shaft all rotate in unison so that there can be no linear movement of the actuating rod and, thus, no movement of the blades from the feathered position.

In a system such as this, it is, of course, desirable to operate the generator so that it produces maximum output power. On the other hand, it is essential that the system including blades, transmission, generator, and tower not be stressed beyond their mechanical or thermal limits. To satisfy these constraints, the system monitors the output power from the generator and varies the pitch of the blades to limit generator output to its maximum power rating. Instead of measuring the generator output directly, however, the system employs a generator of the induction type which operates normally at a speed somewhat greater than its nominal synchronous speed. The deviation from synchronous speed is referred to as "slip" given in absolute RPM or as a fraction or percentage of synchronous speed. It is characteristic of such a generator that its output power varies directly with the amount of slip. Therefore, the shaft speed of the generator which changes with slip, provides a direct indication of the generator output. A tachometer monitors that speed and applies a signal to the controller. The controller, in turn, controls the clutch and the servomotor so as to vary the pitch of the turbine blades from their aforesaid maximum power position as needed to limit output power from the generator to its maximum rating despite changing wind conditions.

When the present system is started, we will assume the blades are feathered and the turbine is stationary. A signal from a central control station causes the controller to decouple the clutch and drive the servomotor so that the motor rotates the control shaft. This retracts the actuating rod thereby moving the blade pitch angle toward the start position. When the pitch sensor detects that the blades have reached start-up pitch, the controller engages the clutch and stops the servomotor so that the blades remain at this pitch angle.

If wind speed is above the minimum necessary to sustain useful power output from the turbine, the turbine will be accelerated to a start-up speed. If this speed is sustained for a brief period, the controller will again disengage the clutch and activate the servomotor to move the turbine blades to their full-power position. When the generator tachometer indicates a speed-producing positive slip so that the generator is producing useful power, the controller effects connection of the generator to the power grid.

As the wind speed increases, the generator speed increases until the generator reaches the allowed maximum power. At this point, the generator speed sensor issues a signal to the controller causing it to decouple the clutch and activate the servomotor to rotate the control shaft relative to the turbine shaft to move the blade pitch toward feather. As a result, the turbine slows down to maintain the generator at its maximum power output condition. Conversely, a subsequent decrease in wind speed causes the controller to move the blade pitch toward the full-power position to maintain the generator at maximum power.

If the wind speed should increase to the point where the pitch of the blades has to be moved to the scram angle in order to maintain the generator at its rated output, indicating excessive strong winds, the controller disengages the clutch and activates the servomotor so as to move the blades to feather thereby stopping the turbine.

Since the present system is composed primarily of rugged mechanical parts, many of which are off-the-shelf items, the cost of manufacturing and assembling the system can be kept to a minimum. Furthermore, repairs, when needed, can be made relatively quickly so that the downtime of the system is also a minimum. Finally, because of its mode of achieving blade pitch control, the system responds quickly and reliably to rapid wind speed changes and is fully protected in the event of excessive wind speeds or emergencies that might cause thermal or mechanical damage to the system.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

While the windpower system specifically described herein is used to drive a generator to deliver electrical power to a utility network ("grid"), it should be understood that the same basic system can also be used as the motive means for "stand alone" electric generators, irrigation pumps, compressors, conveyors, etc.

Figure 1:
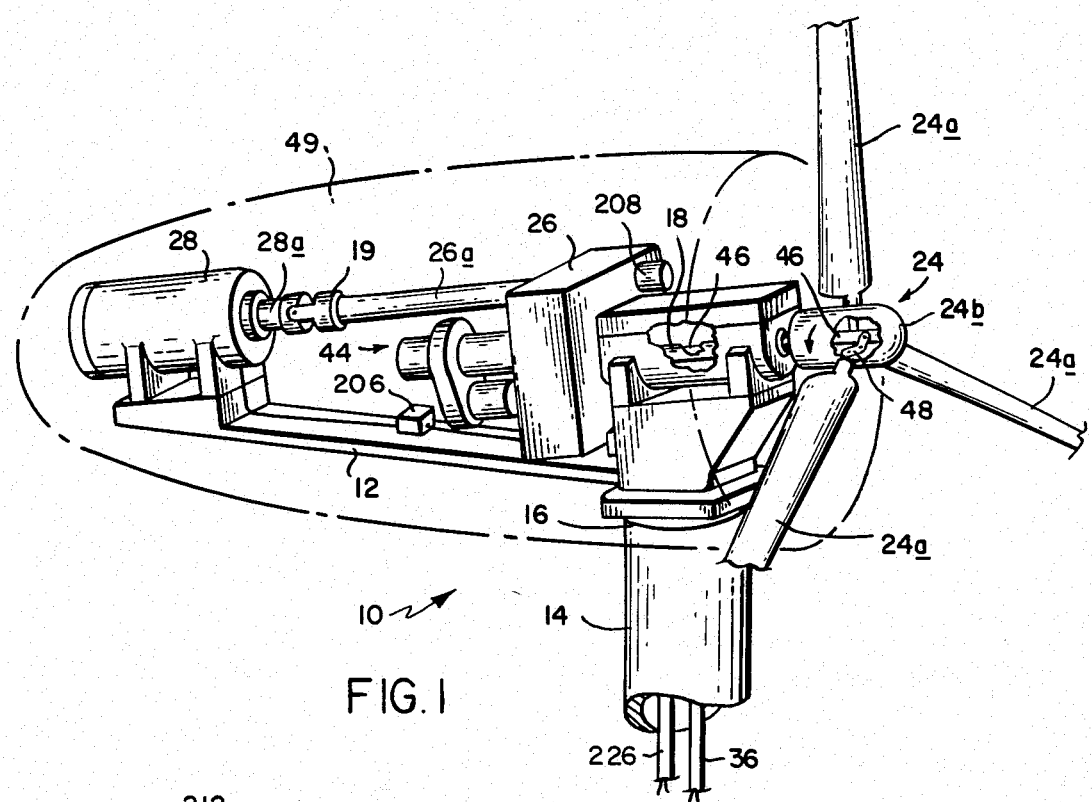
FIG. 1 is a fragmentary perspective view with parts broken away of a tower-mounted windpower system incorporating the invention.

Referring now to FIG. 1, the windpower system or wind turbine shown generally at 10 comprises a frame support 12 secured to the top of a tower 14 by way of a rotary mounting 16 which permits the support to swivel or yaw. The tower 14 is typically 50 to 150 feet high depending upon the prevailing winds at the particular site. The system includes a rotary turbine shaft 18 which is terminated by a turbine indicated generally at 24. The position and the turbine 24 relative to the rotary mounting 16 is such that the support 12 swivels as needed to maintain the turbine downwind. If desired, a yaw control (not shown) can be included which will positively rotate the support through its mounting 16 so that as the wind direction changes the turbine 24 is kept downwind.

The illustrated turbine 24 is designed so that the intercepted air stream turns it in a selected direction, i.e. counterclockwise as viewed in FIG. 1. Torque is taken from the shaft 18 by way of a transmission indicated generally at 26. Since the illustrated windpower system is used to generate electricity, the transmission output shaft 26a is coupled via a universal coupling 19 to the shaft 28a of a generator 28 to run the generator at high speed.

Thus, when the turbine 24 turns, the generator 28 produces an electrical output which is conducted from the system by way of a cable 36 extending through tower 14 to the electrical load. In most applications, the electrical power is fed into the local utility grid.

In the illustrated system, the turbine blades 24a are rotatively mounted in the turbine hub 24b and provision is made for adjusting the pitch of these blades. More particularly, a pitch control section indicated generally at 44 is mounted to transmission 26. In response to generator speed changes, the control section 44 moves an actuating rod 46 extending axially through shaft 18 from that section to the turbine 24.

Figure 4:
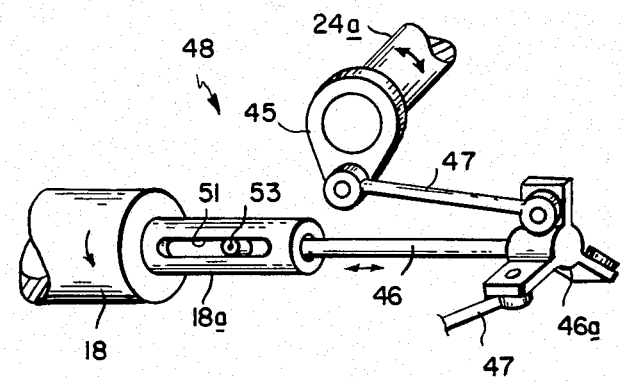
FIG. 4 is a schematic diagram showing the system's blade pitch control linkage in greater detail.

Inside the hub 24b, the rod is connected by way of three bell cranks 48 to the inner ends of the blades 24a. The bell crank 48 connection between rod 46 and one such blade 24a is shown in detail in FIG. 4. As seen there, the inner end of blade 24a a carries an eccentric member 45. Also, a three-armed spider 46a is mounted to the end of rod 46. A link 47 is pivotally connected at its opposite ends to member 45 and an arm of the spider so that linear movement of rod 46 in one direction or the other rotates the blades 24a in one direction or the other to change their pitch. Similar links 47 connect the other two arms of spider 46a to the remaining two turbine blades 24a. In order to rotatively couple rod 46 to the turbine shaft 18 while permitting axial movement of the rod relative to the shaft, a reduced diameter shaft end segment 18a is formed with a lengthwise slot 51. Also, a pin or roller bearing 53 attached to rod 46 projects into that slot, functioning more or less as a cam follower.

Figure 5:
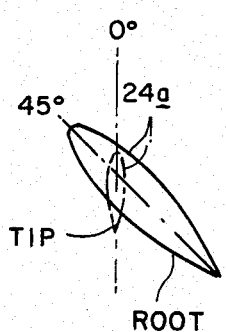
FIG. 5 is a schematic diagram illustrating the profile of each blade of the system.

As shown in FIG. 5, the blades 24a themselves are shaped as air foils. Furthermore, they have an appreciable twist from root to tip. Typically as shown in that figure, the blade tip is oriented about 45° relative to the root of the blade.

A streamlined ventilated housing or cowl shown in dotted lines at 49 in FIG. 1 encloses the support 12 and other components of the system except, of course, the turbine 24.

Figure 2:
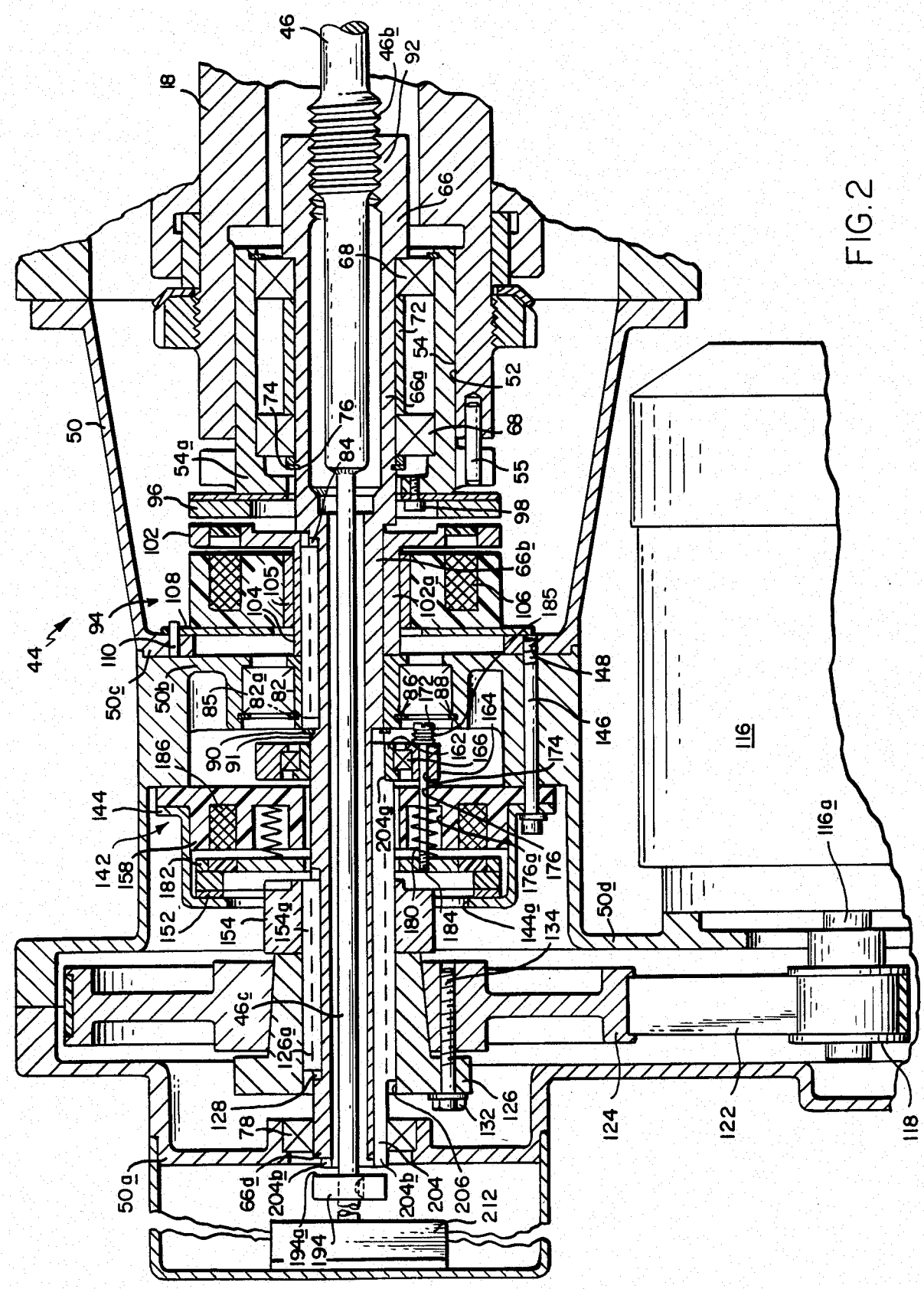
FIG. 2 is a sectional view on a larger scale showing the FIG. 1 system in greater detail.

Refer now to FIG. 2 which shows the components of the pitch control section 44 in greater detail. The shaft 18 projects into a housing 50, where it is formed with a counterbore 52 in order to receive a flanged tubular extension 54. The extension is rotatively coupled to the shaft by pins 55 extending through the extension flange into the end of the shaft. Positioned coaxially within shaft 18 and its extension 54 is a tubular control shaft 66. Shaft 66 has a reduced diameter segment 66a within extension 54 which forms a seat for a bearing unit 68 located inside extension 54 at one end thereof. A second bearing unit 68 spaced from the first by a tubular spacer 72 is located at the opposite end of extension 54. The axial position of the shaft 66 relative to the bearing units and extension 54 is maintained by a locking ring 74 which engages in a circumferential groove 76 formed in shaft segment 66a beyond the bearing units 68.

The opposite end of shaft 66 is journaled by way of a bearing unit 78 located in the end wall 50a of housing 50 remote from the turbine. In the illustrated system, a reduced diameter segment 66b of control shaft 66 extends through an internal neck 50b formed in housing 12 intermediate the ends thereof. A bushing 82 is engaged on shaft segment 66b. The bushing has an internal key 82a which slidably engages in a longitudinal keyway 84 in the shaft segment so that the bushing is rotatively locked to the shaft. The bushing 82 rotates relative to housing neck 50b by way of a bearing unit 85 which seats against the bases of the bushing and neck. Locking rings 86 and 88 engage in circular grooves inscribed around the outside of bushing 82 and the inside of neck 50b so that the bushing is locked to the housing axially, but can rotate relative thereto. A third locking ring 90 seats in a groove formed in control shaft section 66b just to the left of bushing 82 to fix the axial position of the clutch 94 on the control shaft and to absorb thrust.

Referring to FIGS. 1 and 2, the pitch actuating rod 46 leading from the turbine 24 extends into control section 44 and more specifically into the end of the tubular control shaft 66. Furthermore, that end of rod 46 is externally threaded at 46b to mesh with a nut 92 formed at the end of control shaft 66. Also, as described above in connection with FIG. 4, rod 46 is constrained to rotate with the turbine shaft 18, yet is movable axially relative to that shaft by virtue of the pin-in-slot connection between the rod and shaft. As noted previously, the lengthwise or axial movement of the pitch actuating rod 46 changes the pitch of the turbine blades 24a in one direction or the other depending upon whether the control shaft is rotated at a faster or slower rate than the turbine shaft 18.

For example, assuming shaft 18 is rotating in a counterclockwise direction as shown in FIG. 1 and the rod thread 46b is a right hand thread, if shaft 66 is rotated at the same speed as shaft 18, then no relative movement occurs between the control shaft nut 92 and the threaded end 46b of the actuating rod, since that rod turns with shaft 18. Accordingly, there is no change in the pitch angle of the blades. On the other hand, if shaft 66 is rotated counterclockwise, as viewed in FIG. 1, at a faster rate than shaft 18, the threaded engagement of the nut 92 with the rod end 46b causes the rod to retract lengthwise into the shaft 66, i.e., toward the left in FIG. 2. This lengthwise movement of the rod 46, in turn, rotates the blades 24a so as to move them toward their full-power position. Conversely, if the shaft 66 is held stationary or is rotated clockwise, as viewed in FIG. 1, then the relative rotary motion of the control rod threads 46b, with respect to the nut 92 will move the control rod 46 out of the shaft 66 so that the turbine blades are moved toward their feathered position.

In order to control the relative rotation of the control shaft and turbine shaft, the illustrated control section 44 includes a clutch shown generally at 94 which operates between the shaft 18 and the control shaft 66. The clutch 94 includes a discoid clutch plate 96 secured by threaded fasteners 98 to the inner end wall 54a of shaft extension 54. The plate 96 and its connection to extension 54 are such that the plate can flex axially to some extent. Disposed directly opposite plate 96 is a second clutch plate 102 having a tubular extension 102a engaged on the control shaft segment 66b. The plate extension 102a has an internal key 104 which slidably engages in keyway 84 in that segment so that the plate 102 rotates with the control shaft. Encircling the clutch plate extension on a sleeve bearing 105 is an electromagnetic toroidal wire coil and polepiece unit 106. A discoid plate 108 is attached to coil polepiece unit 106 and is restrained from rotation by pins 110 fitted to internal flange 50c in housing 50. Plate 102 is normally disengaged from plate 96 so that shaft 18 (and rod 46) rotates independently of control shaft 66. However, when the clutch coil and polepiece unit 106 is energized, the clutch plate 96 is flexed axially into frictional engagement with plate 102 so that shafts 66 and 18 rotate in unison. As noted previously, as long as there is no relative movement between those two shafts, there is no axial movement of pitch actuating rod 46 and, therefore, no change in the pitch of the blades 24a.

Such relative movement is effected by disengaging the clutch 94 and rotating the shaft 66 at a faster or slower rate than shaft 18. In the illustrated system, this is accomplished by means of a reversible servomotor 116 mounted to a radial enlargement 50d of housing 50. The shaft 116a of the motor carries a pulley 118 which is connected by a belt 122 to a larger pulley 124 coupled to control shaft 66. More particularly, the pulley 124 is engaged on a tapered locking bushing 126 which encircles shaft 66 just inboard of its bearing 78. The bushing has an internal key 126a which slidably engages in a keyway 128 formed in shaft 66. Pulley 124 is secured to the bushing by appropriate threaded fasteners 132 extending through openings in the bushing flange and turned down into threaded passages 134 in the pulley so as to engage the pulley with the tapered bushing. As will be described in detail later, the motor 116 is connected in a servo loop which varies the speed of the motor as the wind speed changes. Therefore, the motor rotates control shaft 66 relative to turbine shaft 18 (and rod 46) to move the actuating rod 46 so as to feather the turbine blades when the wind speed exceeds that required to develop generator rated power and to move them toward their full-power position when the wind speed falls below that which will sustain rated generator output.

In the illustrated preferred embodiment of the system, provision is also made for fully feathering the turbine blades so as to stop the rotation of the turbine 24 and its shaft 18 in the event of a power failure or any other failure which disables the servomotor 116. More particularly and referring to FIG. 2, a brake shown generally at 142 is provided in section 44 which acts between the control shaft 66 and the housing 50 to bring the shaft 66 to a complete stop. With the shaft 66 stopped, the continued rotation of the shaft 18 and the pitch actuating rod 46 to which it is linked causes the rod 46 to move out of the control shaft nut 92 so as to rotate the blades 24a to their feathered position. As they approach that position, the blades gather less wind and, accordingly, the turbine 24 gradually slows to a stop.

The brake 142 comprises a flanged brake housing 144 secured to the housing flange 50c by bolts 146 extending through the brake housing flange and turned down into threaded openings 148 in housing flange 50c. Inside the brake housing 44 is a discoid brake shoe 152 mounted to a hub 154 which extends out through an opening 144a in the brake housing. Hub 154 has a key 154a which is slidably engaged in the control shaft key way 128 so that the hub and brake shoe rotate with that shaft.

Also, positioned inside the brake housing 144 is a discoid plug 158 which is spaced opposite the brake shoe 152. Beyond the plug is a bushing 162, slidably mounted to shaft segment 66b. Also a ring or collar 164 is rotatively mounted to that bushing by way of a bearing unit 166. Bolts 172 are slidably received in openings 174 in collar 164. These bolts extend through registering openings 176 in plug 158 which openings are counterbored at 176a to accept compression springs 180.

Located between the brake shoe 152 and plug 158 is an annular plate or disk 182. A circular array of threaded openings 184 are formed in plate 182 which openings are threaded to receive the bolts 172. Thus the plate is held by the bolts 172 in register with brake shoe 152. Furthermore, the plate is biased against the brake shoe by the springs 180. However, there is sufficient clearance between the engaging plate and the plug 158 to permit the plate to be retracted against the plug, with the bolts 172 sliding in the plug openings 176 and the collar openings 174 toward the right in FIG. 2. Belleville spring washers 185 are included under the heads of bolts 172. These are substantially stiffer than springs 180 and are not materially compressed by the force required translate collar 164 to close the gap between brake disk 182 and plug 158. However, when this gap is closed, the Belleville spring washers 185 allow collar 164 to be translated by a small additional amount without applying destructive tensile loads on bolts 172. A wire coil 186 is contained in the plug 158 which, when energized, moves the plate 182 to its retracted position. Thus as long as the brake coil 186 is energized, the control shaft 66 is free to rotate within the housing 50. However, whenever the brake coil is de-energized due to a power failure, the springs 180 press the plate against the brake shoe 152 which is secured by way of brake housing 144 to the housing 50. Therefore, the control shaft 66 to which the plate 182 is connected is rapidly brought to a stop. Note that in the event of such a power failure, the clutch 94 will be disengaged thereby decoupling the control shaft nut 92 and control rod screw 46a so that shaft 66 is free to move independently of the turbine shaft 18.

Assuming that the turbine shaft 18 and actuating rod 46 are rotating counterclockwise as indicated, their rotary motion relative to the stopped shaft 66 causes the actuating rod 46 to move out of the control shaft, i.e. toward the right in FIG. 2. This results in the blades 24a being brought to their feathered position so that the chord surfaces of the blades 24a no longer intercept the moving air stream. Accordingly, the turbine 24 slows down and eventually will come to a stop. It should be appreciated, then, that, since the brake engages when de-energized, the control section 44 operates in a fail-safe mode in that, in the event of a power failure, the brake 142 always operates to stop the turbine 24.

When the blades 24a are brought to their fully feathered position, the turbine 24 may still be rotating due to its inertia. Means to disengage the brake must therefore be provided to prevent further advance of the blade beyond the feathered position which could destroy components of the pitch control mechanism. More particularly and still referring to FIG. 2, actuating rod 46 has an extension 46c which projects through the housing end wall 50a. Mounted to that extension is a collar 194. Also, the end 66d of the shaft 66 projects through the same wall opposite the collar. The relative positions of the collar and the shaft are such that when the actuating rod 46 advances to a position corresponding to the feathered position of the blades 24a, the brake 142 is released mechanically. More particularly, a circular array of three push rods or keys 204 are slidably positioned in longitudinal passages 206 in the wall of control shaft section 66b. The inner ends 204a of the rods engage the bushing 162. Their outer ends 204b project out beyond the shaft end 66d. The positions of the rod ends 204b are such that at blade feather, the collar 194 engages the rods which thereupon shift the bushing 162 toward the right in FIG. 2 to disengage the plate 182 from the brake shoe 152.

As mentioned previously, Belleville spring washers 185, present under the heads of bolts 172, are substantially stiffer than springs 180 and are therefore not materially compressed by the actuating force applied to separate the braking surfaces of plate 182 and shoe 152.

Now while the brake can no longer retard the rotation of the control shaft, the inertial and frictional torque of the de-energized servomotor multiplied by the step-up ratio of the pulleys 118 and 124 can still retard rotation of that shaft. This would attempt to drive the mechanism further in the feather direction if turbine rotation has not ceased at this point. Such further drive in the feather direction could damage pitch control mechanism components. This possibility is precluded in the present arrangement, however, by further displacement of protruding rods 204b permitted by the Belleville washers and the engagement of collar face 194a and control shaft end 66d which clutchlike action, rotatively couples the actuating rod and control shaft so that no further relative motion of those parts is possible, whereupon the blades are effectively locked in the feathered position.

The objective of the present system is to operate the wind turbine 24 as closely as possible to maximum efficiency to obtain maximum output power from the generator 28, while protecting both the turbine and generator from mechanical or thermal damage. For this purpose, then, the control section 44 includes an electronic controller shown generally at 206 in FIGS. 1 and 3. The controller monitors the generator output and responds to changes in wind speed so as to control the pitch of the turbine blades. When wind speed is less or equal to that which will sustain rated generator power output, near-optimal power output is provided by holding the blades at their full-power pitch position and no servo action is required. However, when wind speed exceeds that required for rated output, the blades are moved toward the feathered position so as to limit generator output power to the rated level.

Preferably, the generator 28 is an asynchronous induction motor operated as a generator. Accordingly, its output power is directly related to the amount of "slip" and therefore to shaft speed. A tachometer 208 mounted to the transmission 26 as shown in FIG. 1 measures the speed of the generator shaft 28a and applies a corresponding electrical signal to controller 206 or more particularly to a microprocessor 210 in that controller. Also coupled to the processor 210 is a signal from a pitch sensor 212 which reflects the pitch of the turbine blades 24a. In response to those signals, the processor operates the clutch 94 and brake 142 by way of their drivers 214 and 216 respectively and motor 116 via its driver 218 to maintain the blade pitch at the correct angle for maximum generator output or which limits output to rated output.

Figure 6:
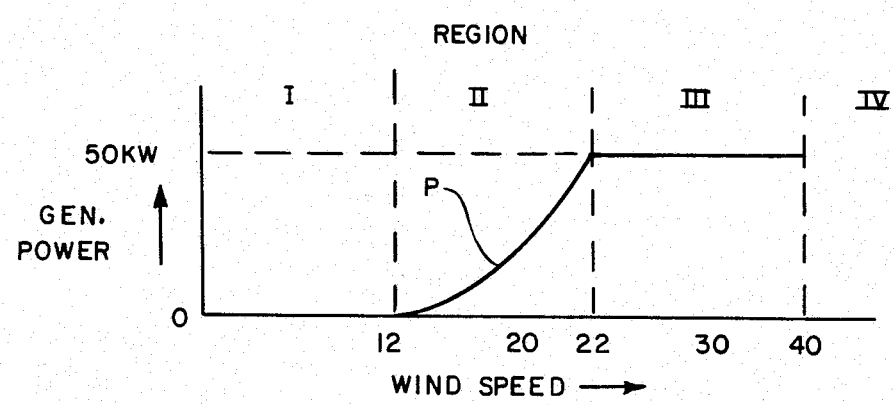
FIG. 6 is a graphical diagram illustrating the operation of the FIG. 1 system.

To start the system assuming the turbine blades are in the fully feathered position, a signal from a remote site control station 224 (FIG. 3) is applied by way of a control cable 226 extending through tower 14 to the controller's processor 210. This causes the processor to issue signals to clutch driver 216 and motor driver 218 thereby releasing the clutch and causing motor 116 to rotate control shaft 66 faster than turbine shaft 18 (which is stationary). This, in turn, moves the pitch of blades 24a to a so-called start position between the feathered and full-power positions, e.g. to a pitch angle of 45°. This start position of the blades enables the turbine to start rotating most easily from a dead stop. The pitch sensor 212 detects when the blades have reached that angle and issues a signal to processor 210 causing it to inhibit the drive current to motor 116 and actuate clutch 94 so that the blades remain in that start position. The system is now operating in Region I as shown in FIG. 6.

The turbine remains in this start-up mode with the blades 24a at their start position until the wind speed exceeds a selected minimum value, e.g. 12 mph. When the wind does exceed that speed, if the system's controller 206, which monitors the speed of generator 28, senses that the generator speed has exceeded a selected magnitude, e.g. 250 rpm for a certain time e.g. 30 seconds, the controller causes the blades to be moved to their full power position. That is, the controller disengages the clutch 94 and activates servomotor 116 until the blades have moved to the full power angle, e.g. about 0°, after which the motor is disabled and the clutch re-engaged to lock the blades at that angle.

With the blades at the full-power position, as the wind speed increases, the generator speed increases. Resultantly, the generator output power increases as shown by the waveform P in the Region II in FIG. 6. When the generator reaches or exceeds synchronous speed, the controller 110 closes switch 227 to connect the generator 28 to the power grid.

On the other hand, if that start-up speed is reached only momentarily due to a stray wind gust, the blades remain at their start angle and the turbine simply idles in operating Region I with the generator isolated from the utility grid.

In a typical installation, the maximum power level is reached at a "rated" wind speed of approximately 22 mph. When the generator speed reaches the speed for maximum power, this condition is sensed by tachometer 208 and the processor 210 with which it communicates. In response to this condition, the processor momentarily decouples the clutch 94 and energizes servomotor 116 to move the blades 24 toward their feathered position. Resultantly, the turbine slows down by the amount that will limit the generator power at that maximum. In other words, the blades are moved toward the feathered position to limit the torque output of the turbine when the wind speed exceeds the system's rated wind speed. Then, as a result of subsequent increases or decreases in wind speed, the controller decouples the clutch and operates the servomotor to move the blades away from or toward their full-power position to compensate for the wind speed change in order to maximize generator output power in Region II winds or limit power to its rated output in Region III winds. The system is now operating in Region III of FIG. 6.

If the wind should die (i.e. fall into Region I) so that the generator is not delivering useful power to the utility grid for a prescribed time, this condition is sensed by the tachometer 208 and processor 210. The processor thereupon opens the electrical switch 227 to the grid and returns the turbine blades 24a to their start-up position. On the other had, if wind speed increases dangerously, e.g. to 41 mph in Region IV of FIG. 6 to the point where the blades have had to be moved to the scram angle (e.g. 20°) in order to maintain the rated generator output, the controller disengages the clutch 94 and drives the servomotor 116 in the opposite direction from the turbine. This relative motion fully feathers the blades to avoid damage to the system.

Further, if the processor 210 does not receive a signal from the pitch sensor 208 within a very short time interval, e.g. 10 seconds indicating that the blades are not feathered due, for example, to a damaged motor 116 or a broken pulley belt 122, the processor de-energizes motor 116, the clutch 94 and the brake 142. This results in the blades being feathered by the force provided by the rotating turbine as discussed above, albeit at a slower rate than if feathered by the servomotor. Likewise, if there is a power failure to the system, the clutch and brake are de-energized with the same results. Indeed, the processor 210 initiates this fail-safe braking mode when any command to feather from the processor fails to accomplish that result within a selected time-out period or the generator power output is not reduced below the selected rated value.

The pitch sensor 212 may be any one of a variety of different types. For example, simple mechanical, optical or magnetic switches responding to the lengthwise position of actuating rod extension 46c may be used, one switch closing when the blades are feathered at 90°, a second switch closing when they are at the 45° start-up angle, a third when they are at the 20° scram angle, and a fourth switch closing when they are at the full-power pitch angle of 0°. The switches are connected to apply appropriate voltage levels to the controller processor 210 to cause the processor to produce the necessary outputs for properly controlling the clutch, brake and servomotor in control section 44 as discussed above. Alternatively, a digital encoder (incremental or absolute) or a potentiometer (plus an analog to digital converter) driven by the actuating rod extension 46c may be used to communicate the pitch position to the processor 210. These alternatives allow positions to be adjusted by processor software changes or by commands received from the site control station 224. These devices also allow the site control station to monitor blade pitch more closely, for example, to obtain diagnostic information.

Figure 3:
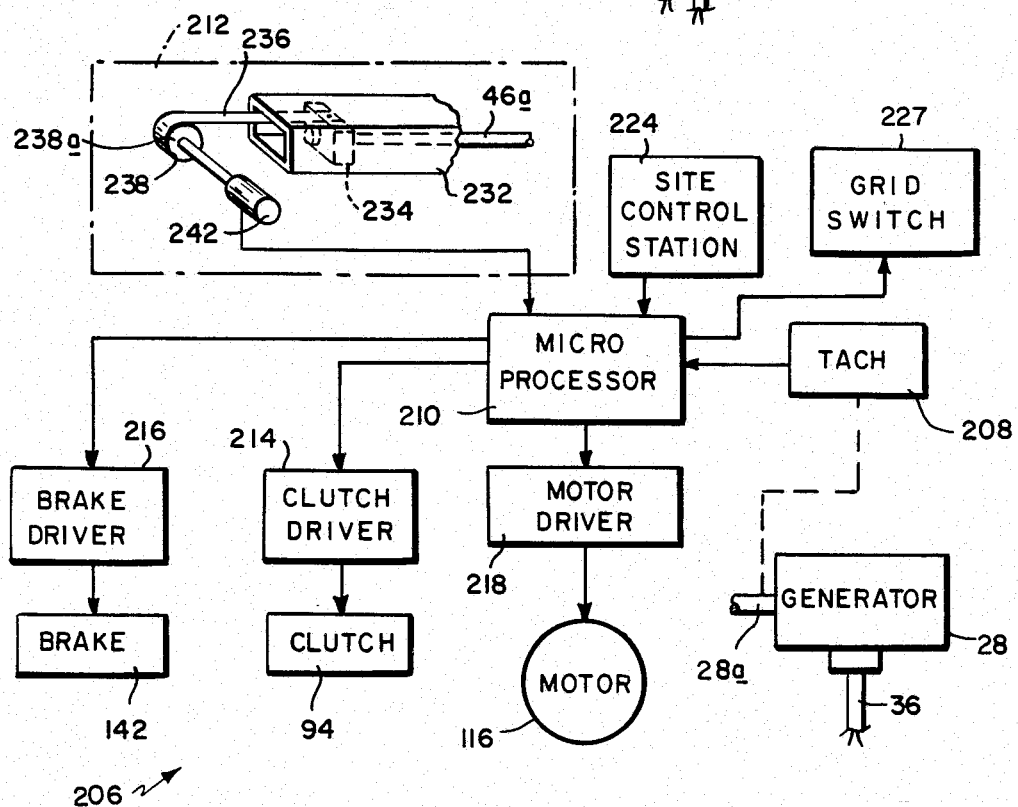
FIG. 3 is a schematic diagram showing the control section of the FIG. 1 system.

In FIG. 3 we have illustrated a particularly accurate sensor 212 for monitoring blade pitch continuously. Here, the end of rod extension 46c projects into the end of a slide 232 having a square cross-section wherein it engages a square slider 234 which is movable along the slide. A rotary connection is provided between the rod extension 46c and the slider to accommodate the rotary motion of the extension. Attached to the nut is one end of a flat flexible strap 236 whose opposite end is wound up on a roller 238. The roller is spring biased to wind up the strap and its shaft 238a is coupled to the shaft of a digital shaft encoder 242. Thus the digital output of the encoder reflects the linear position of the rod extension 46c upon which depends the pitch of blades 24a.

It will thus be seen that the objects set forth above, among those made apparent from the preceding description, are efficiently attained. Also certain changes may be made in the above construction without departing from the scope of the invention. For example, the clutch 94 and motor 116 may be substituted for by a single synchronous servomotor to rotate control shaft 66 at the correct speed relative to turbine shaft 18 in response to control signals from processor 210 to control blade pitch. Alternatively, countershaft means may be provided to derive clockwise and counterclockwise torque from the wind torque, selectively coupled through electrical clutches to the pitch control shaft 66 to effect changes in pitch. In this case, the capacity of motor 116 may be substantially reduced since it would only be required to slowly move the pitch angle from the feather position to the start-up angle to permit start-up rotation of the turbine. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A windpower system comprising
   A. a support,
   B. a turbine shaft rotatively mounted to the support,
   C. a turbine having variable pitch blades rotatively mounted to a hub connected to one end of the turbine shaft,
   D. an induction generator coupled to the turbine shaft and for producing rated output power, the speed of said generator being indicative of the output power from the generator,
   E. means for monitoring the speed of the generator and producing a signal indicative of said speed,
   F. a control shaft rotatively mounted to the support,
   G. means for moving the pitch angle of the blades in response to the relative rotation of the control shaft and the turbine shaft,
   H. means for varying said relative rotation in response to changes in the torque developed by the turbine shaft,
   I. monitoring means for controlling rotation of the control shaft so that the generator produces maximum output power when wind speed is below the machine's rated wind speed, and no more than rated output power when wind speed exceeds rated wind speed,
   J. a brake acting between the support and the control shaft so that by engaging the brake, the blades can be moved to their fully feathered position solely by the torque developed by the rotating turbine,
   K. means responsive to the total angular displacement from a reference position of the control shaft relative to the turbine shaft for indicating when the blades are in the featured position, a start-up position, the full-power position and a so-called scram position between the latter two positions, and
   L. control means operative in response to the indicating means for engaging the brake to move the blades to their fully feathered position when they have moved from their full-power position to said scram position if wind speed is so high that rated generator power is sustained even with the turbine feathered back to the scram angle.

2. The system defined in claim 1 wherein the brake is an electrical brake which derives its electrical power from a network which loads said generator so that when the electrical connection to the power network is interrupted, the brake is deenergized and engaged whereby the blades are moved to their fully feathered position.

3. A windpower system comprising
   A. a support,
   B. a turbine shaft rotatively mounted to the support,
   C. a turbine having variable pitch blades rotatively mounted to a hub connected to one end of said turbine shaft,
   D. torque take-off means connected to said turbine shaft,
   E. a control shaft rotatively mounted to the support,
   F. means for increasing blade pitch when the rotation of the turbine shaft in an intended winddriven direction is faster than that of the control shaft and decreasing blade pitch when the turbineshaft rotation in the intended direction is slower than the control-shaft rotation in the intended direction, and
   G. an electrical brake acting between the support and the control shaft so that by engaging the brake, the blades can be moved to their fully feathered position solely by the torque developed by the rotating turbine, said electrical brake engaging when deenergized so that in the event of a power failure, the turbine blades are feathered.

4. A windpower system comprising
A. a support,
B. a turbine shaft rotatively mounted to the support,
C. a turbine having variable pitch blades rotatively mounted to a hub connected to one end of the turbine shaft,
D. torque take-off means connected to said turbine shaft,
E. a control shaft rotatively mounted to the support,
F. means for changing the pitch of the blades in response to the relative motion of the control shaft and the turbine shaft, the pitch changing means including linear actuating means rotatively fixed to the turbine shaft and whose linear position relative to a reference position is indicative of the pitch angle of said blades,
G. a brake acting between the support and the control shaft so that by engaging the brake, the blades can be moved to their fully feathered position solely by the torque developed by the rotating turbine, and
H. means for disengaging the brake and rotatively coupling the control shaft and turbine shaft when the blades reach their feathered position so as to maintain the blades in that position, the disengaging and coupling means including:
 (1) brake release means extending to the brake, said release means mechanically disengaging the brake when moved, and
 (2) means on the actuating means for moving the release means and frictionally engaging the control shaft when the actuating means has moved linearly to a position corresponding to the feathered position of the blades.

5. A windpower system for generating a rated output power comprising:
A. a support;
B. a turbine shaft rotatably mounted on the support;
C. a turbine to be propelled by wind, the turbine including a hub and having a variable-pitch blades rotatably mounted on the hub for rotation among positions including a full-power position, a feathered position, and a so-called scram position between the latter two positions;
D. a generator coupled to the turbine shaft for driving by the turbine to generate power;
E. means for monitoring the pitch of the blades to indicate when the blades are in the feathered position, the scram position, and the full-power position; and
F. means for controlling the blade pitch to tend to achieve the rated output power but for moving the blades to their feathered positions if wind speed is so high that the rated output power is sustained even when the blades are in their scram positions.

* * * * *